Feb. 9, 1954 W. P. OEHLER ET AL 2,668,490
FLEXIBLE TREAD PRESS WHEEL
Filed Aug. 15, 1951
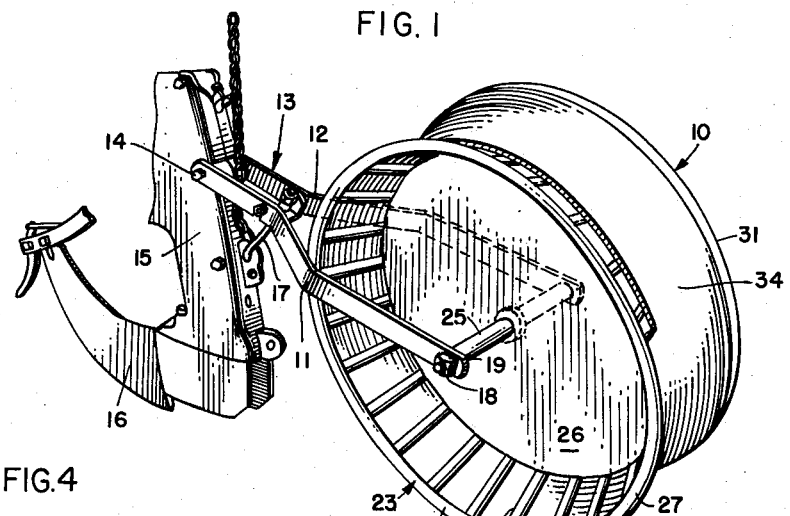
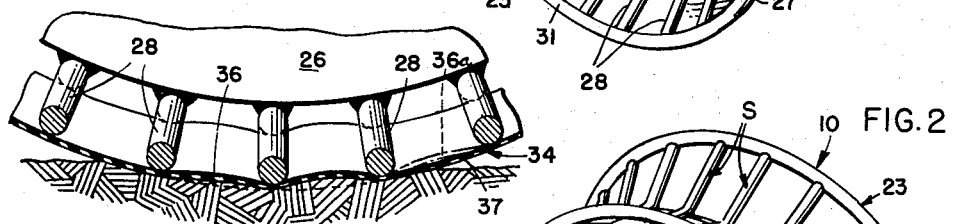
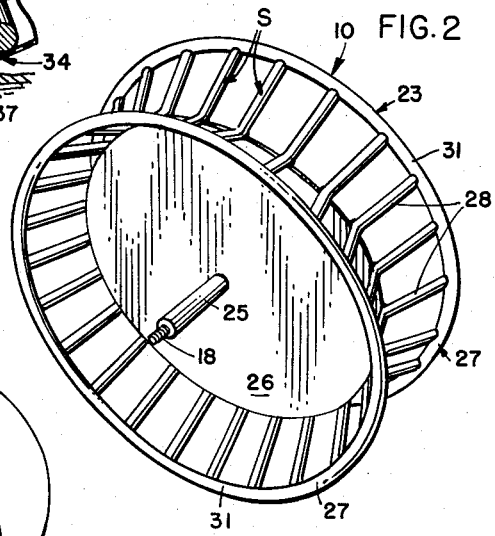
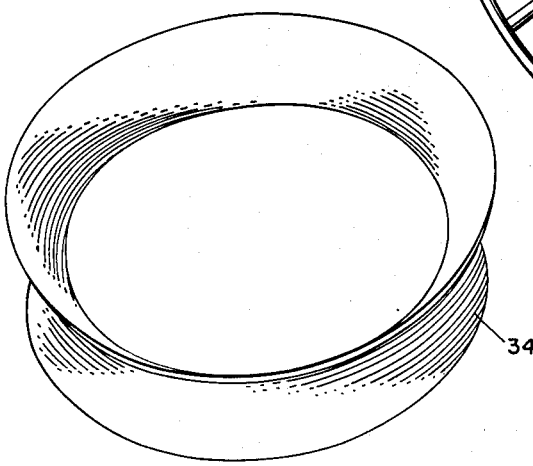
INVENTORS:
WILLIAM P. OEHLER
ARTHUR J. IMMESOETE
BY
ATTORNEY Patented Feb. 9, 1954

2,668,490

UNITED STATES PATENT OFFICE 2,668,490

FLEXIBLE TREAD PRESS WHEEL

William P. Oehler and Arthur J. Immesoete, Moline, Ill., assignors to Deere & Company, Moline, Ill., a corporation of Illinois Application August 15, 1951, Serial No. 241,908

2 Claims. (Cl. 97—56)

1

The present invention relates generally to agricultural implements and more particularly to press wheels for planters and the like.

The object and general nature of the present invention is the provision of a press wheel construction in which the wheel proper is provided with a reticulated rim portion over which is stretched an endless band of resilient flexible or rubber-like material, there being sufficient tension in the band to insure that the band remains in place on the rim portion of the wheel, and any soil or the like that tends to adhere to the band will be shed by virtue of the portions of the band being displaced laterally inwardly into the open spaces of the wheel rim as the wheel rolls along the ground. More specifically, it is a feature of this invention to provide a press wheel structure which includes a wheel having a rim formed by a plurality of peripherally spaced cross rods fixed at generally intermediate points to a wheel body or web, with an endless band of resilient material overlying said rods, portions of the band being displaceable radially inwardly into the spaces between said rods.

These and other objects and advantages of the present invention will be apparent to those skilled in the art after a consideration of the following detailed description, taken in conjunction with the accompanying drawings, in which:

Figure 1 is a perspective view of the press wheel construction, in which the principles of the present invention have been incorporated.

Figure 2 is a view of the press wheel proper, showing particularly the reticulate rim portion.

Figure 3 is a perspective view of the endless ground-engaging band, preferably formed of flexible resilient material, such as rubber or the like, which is adapted to be applied over the rim portion of the wheel shown in Figure 2.

Figure 4 is a fragmentary and somewhat diagrammatic view the manner in which the flexing of the resilient band serves to shed any soil adhering to the band, as the press wheel rolls forwardly.

Referring now to the drawings, the press wheel structure in which the principles of the present invention have been incorporated is indicated in its entirety by the reference numeral 10 and, for purposes of illustration, has been shown as mounted for rotation between the two bars 11 and 12 which, suitably secured together, form a press wheel frame 13 which is adapted to be pivotally connected, as by a bolt 14, to the shank 15 of a planter in which the press wheel structure 10 is incorporated. The shank 15 carries a fur-

2 row opening shoe or runner 16, and the press wheel frame 13 may be adjusted relative to the shank 15 by an adjusting bolt 17. The rear ends of the frame bars 11 and 12 are connected by a shaft 18 on which the press wheel 10 is mounted for rotation, the ends of the shaft being shouldered and threaded to receive nuts 19 by which the rear ends of the press wheel frame bars 11 and 12 are securely fixed to the shaft 18.

The press wheel structure 10 includes a wheel proper, indicated in its entirety by the reference numeral 23 (Figure 2) and the wheel 23 includes a tubular hub section 25, a central disk-like web portion 26 and a rim portion 27 that is formed by a plurality of generally V-shaped crossbars 28 welded to the peripheral edge portions of the disk 26 at their apical or central portions in peripherally spaced relation, as best shown in Figure 2, there being a relatively large space S between each contiguous pair of crossbars 28. Secured to the opposite ends of the crossbars 28 is a pair of endless rings 31 which completes the wheel. An endless band of rubber or rubber-like material, indicated by the reference numeral 34, is disposed about the rim section of the wheel 23, the endless band 34 having sufficient resilience to permit stretching the band in place when mounting the same on the wheel 23. The endless band 34 may be formed of any suitable material, such as rubber or rubber-like stock, and when the band 34 is in place, as shown in Figure 1, there is some tension exerted in a circumferential direction.

In operation, the press wheel structure is normally disposed rearwardly of the associated planter furrow opener, as behind the shank 15 and furrow opener 16 of the planter shown in Figure 1 and is drawn along the ground immediately over the row being planted. As the wheel rolls along the ground, the lowermost portions of the band 34 are deflected, as at 36 (Figure 4), due to the upward pressure of the soil against the band 34 in the spaces adjacent crossbars 28. As the wheel continues to roll forwardly the lowermost radially inwardly deflected portions 36 move outwardly to their normal unstressed position, as indicated at 37 in Figure 4, just as soon as these portions are freed of soil pressure. Therefore, any moist soil that might tend to adhere to the band 34, particularly to the portions 36 between the crossbars 28, is thrown off by the movement of the band portions from their radially inwardly deflected position, shown at 36a in Figure 4, outwardly to their normal position as indicated at 37. Therefore, since the flexing of the band 34 serves to remove any adhering soil and the like, there is no need for scrapers or the like with the press wheel structure of the present invention.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A press wheel structure for planters and the like, comprising a wheel having a reticulate rim portion including axially spaced apart ring members formed of rod-like material and a plurality of peripherally spaced apart, transversely extending rod-like crossbars and a wheel web fixed to the generally central portion of said crossbars, the peripheral spacing of the latter being less than the axial distance between said ring members, and a single endless relatively thin band overlying and contacting each of said crossbars throughout their entire length, portions of said band being displaceable generally radially inwardly into the spaces between said crossbars.

2. A press wheel structure as defined in claim 1, further characterized by said band being of substantially uniform thickness from one edge thereof to the other edge.

WILLIAM P. OEHLER.
ARTHUR J. IMMESOETE.

References Cited in the file of this patent

UNITED STATES PATENTS

| Number | Name | Date |
|---|---|---|
| 1,004,655 | Johnson | Oct. 3, 1911 |
| 1,062,882 | Bruene | May 27, 1913 |
| 2,249,638 | Rietz | July 15, 1941 |
| 2,555,249 | Schlentz | May 29, 1951 |